UNITED STATES PATENT OFFICE.

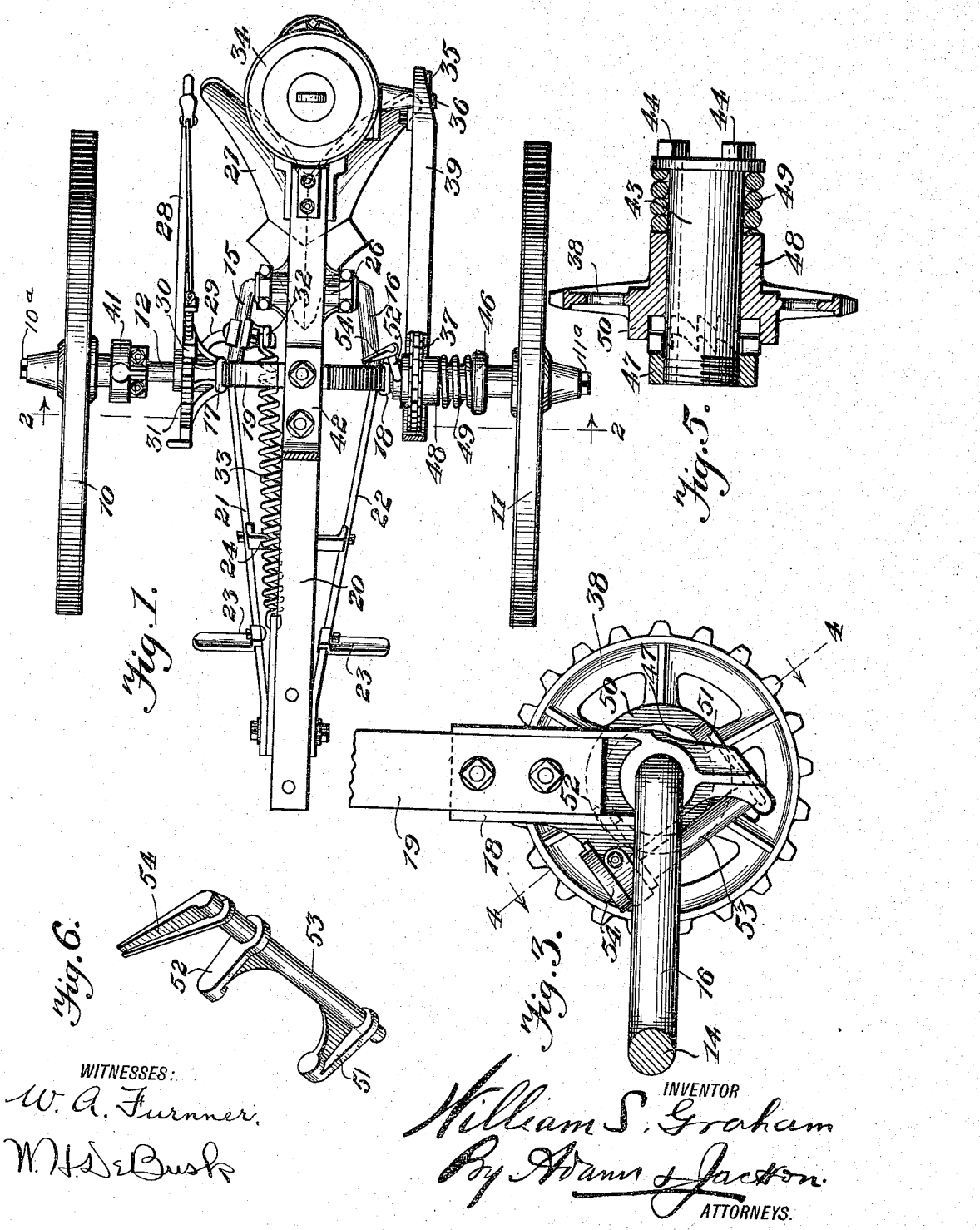

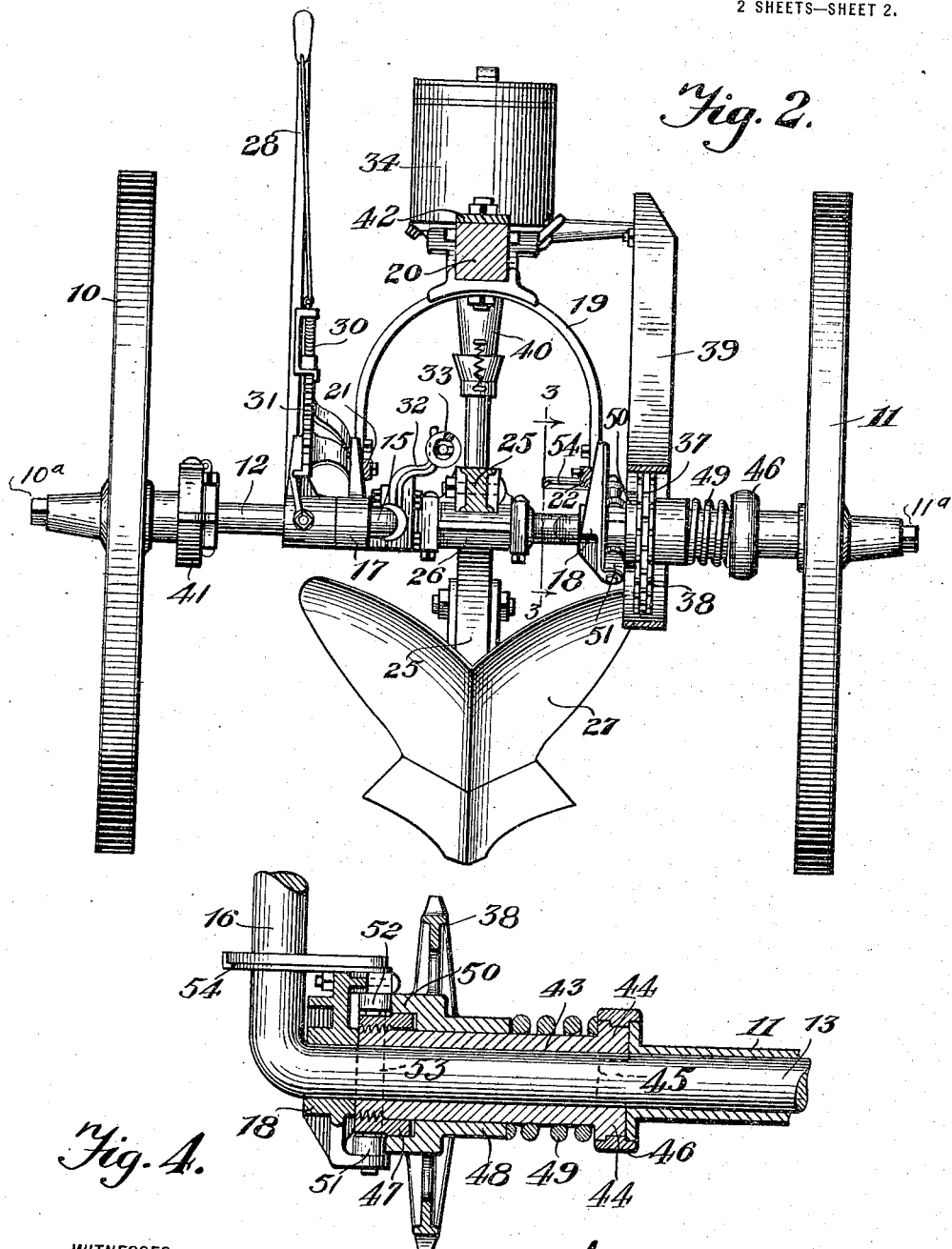

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

CLUTCH MECHANISM.

1,171,114.  Specification of Letters Patent.  Patented Feb. 8, 1916.

Application filed May 25, 1914. Serial No. 840,812.

*To all whom it may concern:*

Be it known that I, WILLIAM S. GRAHAM, a citizen of the United States, residing at Canton, in the county of Fulton, State of Illinois, have invented certain new and useful Improvements in Clutch Mechanisms, of which the following is a specification, reference being had to the accompanying drawings.

This invention relates to clutch mechanisms, and is shown applied to planters of the lister type, adapted to plant either cotton or corn, the arrangement being such that the action of the seed dropping devices may be automatically stopped upon the raising of the soil opening devices and again automatically started upon the subsequent lowering of the soil opener.

It is one of the objects of my invention to provide improved means in connection with such a clutch for protecting the bearings against sand and dust, and also to provide improvements in the manner of mounting the clutch spring such that said spring does not press upon the wheel bearings, whereby undue wear upon said bearings is prevented.

It is another object of my invention to improve devices of this type in sundry details hereinafter pointed out.

The preferred means by which I have accomplished my objects are illustrated in the drawings and are hereinafter specifically described.

In the drawings: Figure 1 is a plan view of a planter embodying my improvements, with the operator's seat broken away; Fig. 2 is a transverse section taken on line 2—2 of Fig. 1; Fig. 3 is an enlarged detail being substantially a section taken on line 3—3 of Fig. 2; Fig. 4 is a section taken on line 4—4 of Fig. 3; Fig. 5 is an enlarged detail, being a vertical section through the clutch when in open condition; and Fig. 6 is a perspective view of the clutch operating lever.

Referring to the several figures of the drawings in which corresponding parts are indicated by the same reference characters, 10—11 indicate the supporting wheels journaled upon the laterally extending end portions 12—13 of the axle member, said axle member being offset at its central portion 14 by means of rearwardly-extending portions 15—16. Mounted upon the portions 12—13 of the axle member are two brackets 17—18 to which are connected the lower ends of a vertically-positioned arch member 19, to the upper central portion of which a short tongue 20 is suitably connected. Extending forwardly from the brackets 17—18 are two side bars 21—22 connected at their forward ends to the tongue 20 and supporting foot rests 23 in convenient position for the use of the operator. At about their middle points the side bars 21—22 are connected by a transversely-extending bar 24 to which the front end of a plow beam 25 is pivotally connected in any suitable manner, said beam being pivotally mounted by means of a suitable coupling 26 upon the transversely-extending middle portion 14 of the axle member. The plow beam 25 is turned downward at its rear end, upon which is suitably mounted a double mold board plow 27. As will be readily understood, upon a partial rotation of the axle member by any suitable means, the plow 27 will be raised or lowered, whereby it may be thrown into and out of operative position.

The means provided for swinging the axle member for controlling the position of the plow 27 comprises a lever 28 fixed upon the portion 12 of the axle member and connected by means of an arm 29 to the rearwardly-extending portion 15 of said axle. The lever 28 is adapted to be locked in adjusted position relative to the framework by means of a spring pawl 30 adapted to be thrown into and out of operative engagement with a circular rack-bar 31 carried by the bracket 17. The arm 29 has rising from it an arm 32 to which is connected the rear end of a spring 33, the front end of which is connected in any suitable manner to the tongue 20 in advance of the arm 32, said spring 33 being adapted to assist in swinging the axle member for raising the plow 27 as will be readily understood.

The tongue 20 has mounted upon its rear end a seed hopper 34 which is provided with suitable seed dropping devices of any appropriate type adapted to be operatively rotated by means of a gear 35 mounted upon a shaft 36, as best shown in Fig. 1, said shaft being adapted to be rotated by a sprocket chain 37 operating upon a gear 38 driven from the wheel 11, as hereinafter described. The gearing by which the seed dropping devices are operated is shown in the drawings as protected by a housing 39, partly broken away, in Figs. 1 and 2. By the rotation of the seed dropping devices mounted in the hopper 34 the seed are delivered to a spout 40 leading from the hopper 34 and delivered in proper position to the furrow opened by the plow 27.

The outer ends of the hubs of the wheels 10—11 are closed by caps 10ª 11ª, respectively so as to keep out the particles of flying sand, and the inner end of the hub of the wheel 10 is protected by a sand band 41 of any suitable type. The inner end of the hub of the wheel 11 is protected from the sand by the means hereinafter described. The tongue 20 has mounted upon it a spring 42 adapted to carry at its upper end (broken away in the drawings) a suitable seat for the operator.

Inasmuch as the parts so far described are of the ordinary construction, it is believed that it is not necessary to describe them or their operation further herein.

Coming now to the clutch mechanism by which the seed dropping mechanism mounted in the hopper 34 is driven through the medium of the gear 38 and the chain 37 continuously while the plow 27 is in its lowered operative position, and to the means by which the rotation of the gear 38 is stopped upon the raising of the plow 27, 43 indicates a sleeve revolubly mounted upon the portion 13 of the axle member provided with lugs 44 at its outer end adapted to intermesh with lugs 45 upon the inner end of the hub of the wheel 11 so as to cause the sleeve 43 to rotate with said wheel. About the juncture between the sleeve 43 and the hub of said wheel 11 is mounted a sand band 46 of any suitable type adapted to prevent sand from entering the bearing of said parts upon the axle. Fixed upon the inner end of the sleeve 43 is one of the members 47 of a two-part clutch, said clutch member 47 being adjustably secured upon the end of the sleeve 43 by means of screw threads in the construction shown. Slidably mounted upon the sleeve 43 adjacent to the clutch member 47 is the coöperating clutch member 48, said clutch members being held yieldingly in operative engagement with each other by means of a spring 49 interposed upon the sleeve 43 between the clutch member 48 and the flanged outer end of said sleeve. The clutch member 48 has formed with it or suitably secured thereon the gear 38 hereinbefore referred to. The clutch member 48 also comprises a bearing collar 50, having a smooth inner edge extending beyond the engaging teeth of the clutch and surrounding the clutch member 47, as best shown in Fig. 4. Bearing upon the inner edge of the bearing collar 50 are two arms 51—52 mounted upon a rock-shaft 53, which is revolubly mounted upon the bracket 18, as best shown in Fig. 4. The rock-shaft 53 is also provided at one end with an arm or lever 54 which extends into the path of the crank-arm 16 of the axle member whereby, upon the swinging of the crank portion of the axle through the medium of the lever 28 for raising the furrow opener, the arm 16 is brought into engagement with the lever 54 turning the rock-shaft 53 and moving the arms 52 to the right in Fig. 4, moving the clutch member 48 out of engagement with the clutch member 47 against the action of the spring 49.

As will be readily understood from the above description, when the lever 28 is given a stroke in advance for raising the plow 27 the lever 54 is automatically swung against the action of the spring 49, throwing the clutch out of operation and thus silencing the seed dropping mechanism. Whenever thereafter the lever 28 is given a stroke to the rear the arm 16 of the crank is moved out of engagement with the arm 54, withdrawing the arms 51—52 from the bearing ring or collar 50 permitting the spring 49 to move the clutch member 48 again into operative engagement with the clutch member 47 for operating the seed dropping mechanism.

By the use of my improved construction and arrangement in which the spring 49 is interposed between the flanged end of the sleeve 43 and the clutch member 47 which is adjustably fixed upon said sleeve, the spring is prevented from pressing in any way upon the bearing of the wheel 11 upon the axle. I have in this way avoided a very serious objection to prior constructions in which the clutch spring has borne against such bearings resulting in a gradual cutting of the bearings and a corresponding loosening of the wheels.

What I claim as my invention and desire to secure by Letters Patent, is—

1. The combination of an axle, a carrying wheel mounted thereon having its hub closed at the outer end, a sleeve flanged at its outer end mounted on said axle and having an operative engagement with said hub for rotation thereby, a two-part clutch mounted on said sleeve and adapted to be driven thereby, a spring mounted between said clutch and the flange on said sleeve tending to hold said clutch members in engagement, and a sand band about the juncture between the sleeve and the hub.

2. The combination of an axle, a wheel revolubly mounted thereon, a sleeve mounted on said axle and adapted to revolve with said wheel, a clutch member fixed upon said sleeve, a coöperating clutch member slidably mounted on said sleeve, a spring tending to hold said clutch members in engagement, a rock-shaft revolubly mounted adjacent to the inner end of said sleeve having arms extending into engagement with the inner end of the slidably mounted clutch member, said clutch member comprising a bearing collar having a smooth inner edge for engagement by said arms, and means for rocking said rock-shaft for throwing said slidably mounted clutch member out of engagement with the first-named clutch member.

3. The combination of a shaft, a wheel revolubly mounted on said shaft, a sleeve revolubly mounted on said shaft and adapted to revolve with said wheel, a clutch member adapted to be rotated by said sleeve, a second clutch member adapted to be moved into and out of operative engagement with said first-mentioned clutch member, yielding means tending to hold said clutch members yieldingly in operative engagement, and means for holding the yielding means against pressure upon said hub.

4. The combination of a shaft, a wheel revolubly mounted on said shaft, a sleeve revolubly mounted on said shaft and adapted to revolve with said wheel, a clutch member adapted to be rotated by said sleeve, a second clutch member adapted to be moved into and out of operative engagement with said first-mentioned clutch member, yielding means tending to hold said clutch members in operative engagement with each other, and means serving while said clutch members are in operative engagement to hold said yielding means against pressure upon said wheel relative to said shaft.

5. The combination of a shaft, a wheel revolubly mounted on said shaft, a sleeve revolubly mounted on said shaft and adapted to revolve with said wheel, a clutch member adapted to be rotated by said sleeve, a second clutch member slidably mounted on said sleeve and adapted to be moved into and out of operative engagement with said first-named clutch member, and a coiled spring mounted on said sleeve bearing at one end against said second clutch member and having a bearing at its other end upon said sleeve whereby the spring tends to hold said clutch members yieldingly in operative engagement.

6. The combination of a shaft, a wheel revolubly mounted on said shaft, a sleeve revolubly mounted on said shaft and adapted to revolve with said wheel, a clutch member fixed on said sleeve, a collar on said sleeve, a clutch member slidably mounted on said sleeve between said first-named clutch member and said collar adapted to be moved into and out of operative engagement with said first-named clutch member, and a coiled spring mounted on said sleeve bearing on said second clutch member and said collar tending to hold said clutch members yieldingly in operative engagement.

WILLIAM S. GRAHAM.

Witnesses:
WILLIAM C. LINTON,
CHARLES W. GRAY.

Copies of this patent may be obtained for five cents each, by addressing the "Commissioner of Patents, Washington, D. C."